US010760931B2

(12) United States Patent
Cherkashin

(10) Patent No.: US 10,760,931 B2
(45) Date of Patent: Sep. 1, 2020

(54) DYNAMIC CONTROL OF PERFORMANCE PARAMETERS IN A SIX DEGREES-OF-FREEDOM SENSOR CALIBRATION SUBSYSTEM

(71) Applicant: Microsoft Technology Licensing, LLC, Redmond, WA (US)

(72) Inventor: Lev Cherkashin, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 326 days.

(21) Appl. No.: 15/652,081

(22) Filed: Jul. 17, 2017

(65) Prior Publication Data
US 2018/0340804 A1 Nov. 29, 2018

Related U.S. Application Data

(60) Provisional application No. 62/510,231, filed on May 23, 2017.

(51) Int. Cl.
*G01D 18/00* (2006.01)
*G06F 3/0346* (2013.01)
(Continued)

(52) U.S. Cl.
CPC .............. *G01D 18/00* (2013.01); *G01D 5/12* (2013.01); *G06F 3/011* (2013.01);
(Continued)

(58) Field of Classification Search
CPC ........ G01D 18/00; G01D 5/12; G06F 3/0346; G06F 3/011; G02B 27/0176;
(Continued)

(56) References Cited

U.S. PATENT DOCUMENTS

| 5,526,022 A | 6/1996 | Donahue et al. |
| 5,923,170 A | 7/1999 | Kuckes |

(Continued)

FOREIGN PATENT DOCUMENTS

JP  19920361076 A  7/1997

OTHER PUBLICATIONS

Bhatnagar, Devesh Kumar, "Position trackers for Head Mounted Display systems: A survey," In Technical Report TR93, Mar. 29, 1993, pp. 1-21.

(Continued)

*Primary Examiner* — Melissa J Koval
*Assistant Examiner* — Trung Nguyen
(74) *Attorney, Agent, or Firm* — Alleman Hall Creasman & Tuttle LLP

(57) ABSTRACT

A technique for dynamically controlling performance parameters in a six degrees-of-freedom non-line-of-sight sensor subsystem is described. In certain embodiments, a magnetic field sensor is mounted on or proximate to an object to measure a parameter that varies with a position or orientation of the object, where the magnetic field sensor is part of a sensor calibration subsystem. The position or an orientation of the object is determined based on the parameter as indicated in an output of the magnetic field sensor. A receiver bandwidth and/or other operation parameter of the subsystem is dynamically adjusted during operation of the subsystem based on, for example, a transmitter-receiver distance or an operational state of the subsystem.

17 Claims, 14 Drawing Sheets

(51) Int. Cl.
*G06F 3/01* (2006.01)
*G01D 5/12* (2006.01)
*G02B 27/00* (2006.01)
*G02B 27/01* (2006.01)

(52) U.S. Cl.
CPC ...... *G02B 27/0093* (2013.01); *G02B 27/0176* (2013.01); *G06F 3/0346* (2013.01)

(58) Field of Classification Search
CPC .. G02B 27/0093; G01R 33/54; G01R 33/038; G01R 33/56
USPC ........ 324/219–252, 200, 202, 207.2–207.24, 324/500, 529–530, 750.12, 750.21, 324/754.17, 754.29
See application file for complete search history.

(56) References Cited

U.S. PATENT DOCUMENTS

| | | | |
|---|---|---|---|
| 6,789,043 B1 | 9/2004 | Nelson et al. | |
| 6,847,336 B1* | 1/2005 | Lemelson | G16H 20/40 345/8 |
| 7,565,169 B1 | 7/2009 | Theobold | |
| 8,616,974 B2 | 12/2013 | Rubin et al. | |
| 8,942,780 B2 | 1/2015 | Scully et al. | |
| 2005/0077085 A1 | 4/2005 | Zeller et al. | |
| 2006/0012571 A1 | 1/2006 | Rodgers et al. | |
| 2006/0255795 A1 | 11/2006 | Higgins et al. | |
| 2007/0070072 A1 | 3/2007 | Templeman | |
| 2008/0228422 A1 | 9/2008 | Satoh | |
| 2013/0107988 A1* | 5/2013 | Park | H04B 1/24 375/316 |
| 2014/0218726 A1* | 8/2014 | Cheng | G01N 21/65 356/301 |
| 2014/0361956 A1 | 12/2014 | Mikhailov et al. | |
| 2016/0259404 A1 | 9/2016 | Woods | |

OTHER PUBLICATIONS

Raab, et al., "Magnetic Position and Orientation Tracking System," In IEEE Transactions on Aerospace and Electronic Systems, vol. 15, Issue 5, Sep. 1979, pp. 709-718.

"International Search Report and Written Opinion Issued in PCT Patent Application No. PCT/US18/028975", dated Jul. 4, 2018, 11 Pages.

* cited by examiner

DYNAMIC CONTROL OF PERFORMANCE PARAMETERS IN A SIX DEGREES-OF-FREEDOM SENSOR CALIBRATION SUBSYSTEM

CROSS-REFERENCE TO RELATED APPLICATION

This application claims the benefit of U.S. Provisional Application No. 62/510,231, filed on May 23, 2017, which is hereby incorporated by reference in its entirety.

BACKGROUND

Virtual reality (VR) and augmented reality (AR) visualization systems are starting to enter the mainstream consumer electronics marketplace. Near-to-eye display (NED) devices, such as head-mounted display (HMD) devices, can be used to display AR or VR content to users. AR devices may include transparent display elements that enable a user to see virtual content transposed over the user's view of the real world. Displayed objects that appear to be superimposed over the user's real-world view are commonly referred to as virtual objects or "holographic" objects. VR and AR visualization systems can provide users with entertaining, immersive three-dimensional (3D) virtual environments in which they can visually (and sometimes audibly) experience things they might not normally experience in real life.

At least some HMD devices include one or more sensors of various types. For example, some HMD devices include sensors such as cameras to facilitate 3D surface mapping, user head-tracking, etc. These cameras generally must be positioned and oriented very precisely in the device in order to provide a satisfactory experience for the user. Yet normal use of the device over time can cause the cameras to move to varying degrees, depending on the design of the device. A challenge in designing an HMD device or any of various other types of sensor platforms, therefore, is providing a sensor platform that is easily calibrated in the factory and that maintains a high degree of accuracy over the lifetime of the device. Without those characteristics, an HMD's performance can quickly break down into unpleasant or uncomfortable experiences for the user, where rendered content blends poorly with the user's view of the real world.

BRIEF DESCRIPTION OF THE DRAWINGS

One or more embodiments of the present disclosure are illustrated by way of example and not limitation in the figures of the accompanying drawings, in which like references indicate similar elements.

DETAILED DESCRIPTION

Figure 1:
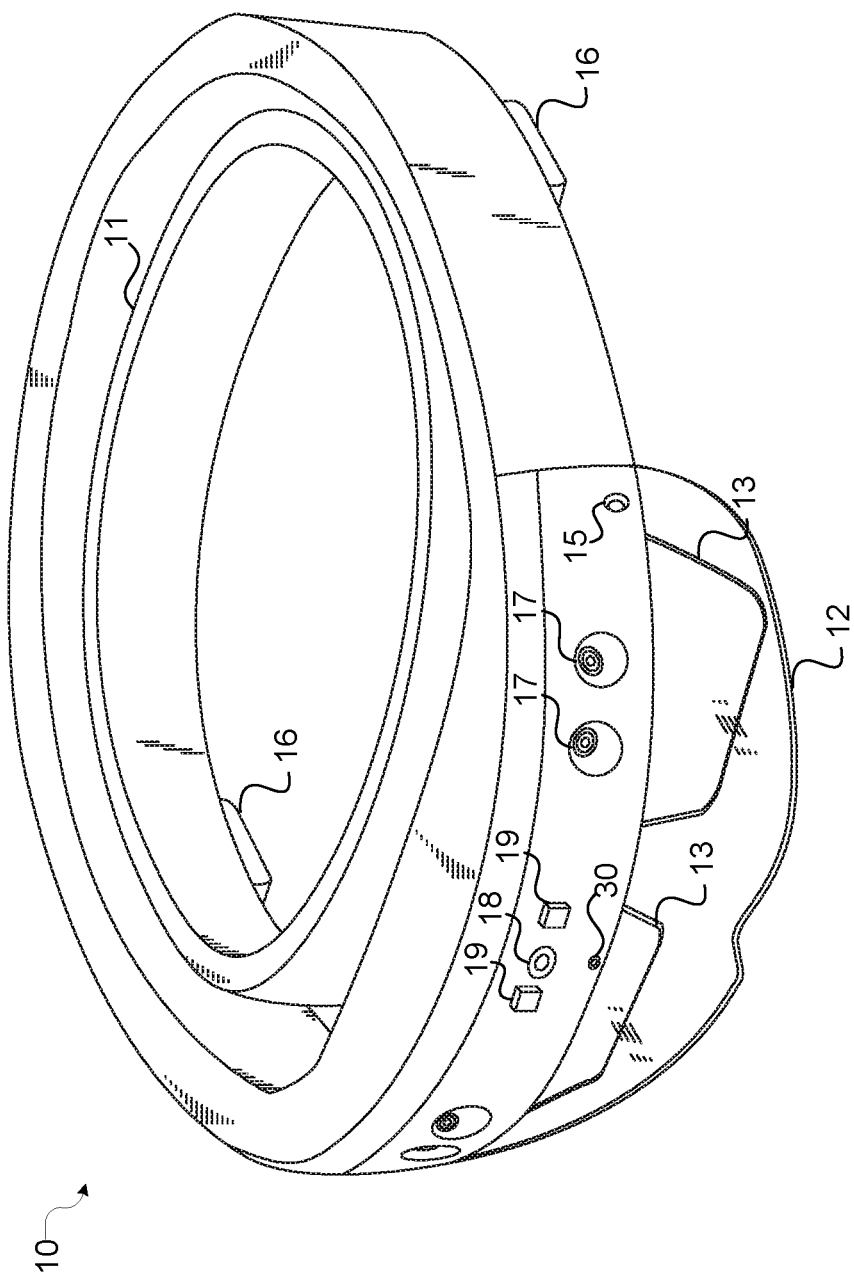
FIG. 1 illustrates a perspective view of an example of an HMD device.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

As noted above, one challenge in designing an AR- or VR-capable HMD device is providing a sensor platform that is easily calibrated in the factory and that maintains a high degree of accuracy over the lifetime of the device. One possible approach to meeting this challenge is to equip such a device with a rigid support structure for the sensors, to prevent any misalignment between the sensors and the rest of the headset or between different sensors. However, such structures tend to be bulky and have thus far met with limited success in avoiding misalignment. Additionally, as form factors for HMDs become more streamlined to meet competitive demands, they will become increasingly less rigid and have less room for sensors and support structures. Furthermore, rigidity requirements encourage colocation of sensors (to minimize the size of structures and potential for deformation), which tends to stifle innovation in sensor layout.

A software-based solution to sensor misalignment is one possible alternative to rigid support structures. Software potentially can be used during operation of the device to computer sensor misalignment and correct for it in real-time. However, a software-based solution is not as accurate as a truly rigid system, and it requires tradeoffs in computing resources and power consumption.

Accordingly, introduced here is a solution that overcomes these and other disadvantages. The solution eliminates the challenges of building rigid sensor support structures by providing sensor modules that have spatial awareness. The sensors are capable of sensing their instantaneous rigid transform in relation to a common reference frame at least every time a measurement is taken. In certain embodiments, every sensor in a given subsystem is able to measure continually its position relative to a common reference point (a transmitter). The reference point becomes the center of the sensor system (the "rig") and a non-line-of-sight "virtual rigid framework (VRF)" is established between all sensors in the subsystem and the transmitter. In certain embodiments, magnetic tracking (e.g., sensing of a magnetic field) is employed to track the positional (locational) and/or orientational (angular) displacement of each sensor relative to the VRF. Appropriate adjustments can be applied to computations and/or to generated images based on the detected displacements. Optionally, an inertial measurement unit (IMU) can be provide and mounted so as to be rigidly coupled to the transmitter, to allow for high frequency corrections to displacement measurements. This approach creates opportunities for many new computer vision based scenarios, including more-streamlined headset form factors, more-sophisticated input devices, and portable holographic capture stages, to name just a few.

Hence, the solution introduced here includes an apparatus and a method for dynamically determining a displacement (e.g., a misalignment) of a given sensor in an electronic system, thereby enabling high-frequency correction for such displacement in real-time. The electronic system can be, for example, an NED device such as an HMD device designed for AR or VR applications. However, it is envisioned that the technique introduced here can be applied advantageously in many different types of electronic devices and systems. The given sensor ("target sensor") can be a camera, for example, such as a head-tracking camera on an HMD device. The term "target sensor" herein refers to a sensor whose position and/or orientation is to be tracked.

The apparatus introduced here can comprise a non-line-of-sight sensor mounted on or proximate to (i.e., less than one centimeter from) a target sensor, tightly mechanically coupled to the target sensor, and configured to measure a parameter that varies with the displacement (angular and/or translational) of the target sensor. The non-line of sight sensor can be or include, for example, a receiver coil that senses a magnetic field produced by a transmitter coil. The apparatus further can comprise at least one processor coupled to the non-line-of-sight sensor and configured to compute the displacement of the target sensor based on the parameter, and to compute an adjustment value based on the computed displacement.

Additionally, introduced here is a technique for dynamically optimizing performance parameters of the apparatus. For example, as described further below, the apparatus can dynamically adjust receiver bandwidth of the non-line-of-sight sensor to selectively achieve a desired trade-off between accuracy and latency.

Before further discussing this technique, it is useful to consider an example of a device in which the technique can be implemented. FIG. 1 shows a perspective view of an example of an AR-capable HMD device that can implement the technique introduced here. The HMD device 10 includes a headband 11, by which the HMD device 10 can be worn on a user's head. Attached to the headband 11 (directly or indirectly) is a transparent protective visor 12 that encloses one or more transparent waveguides 13, each of which can overlay holographic images on the user's view of his real-world environment, for one or both eyes (e.g., by directing emitted light into the user's eyes). The protective visor 12 also encloses various circuitry (not shown) and various sensors.

In the illustrated embodiment, the sensors include: one or more microphones 15 to input speech from the user (e.g., voice commands); one or more visible-spectrum cameras 17 for use in user head tracking (i.e., tracking the user's head position and orientation in real-world space); one or more infrared (IR) spectrum depth cameras 18 for use in surface reconstruction to model the surfaces in the user's real-world environment and/or hand gesture recognition; and one or more visible spectrum video cameras 30 for use in capturing standard video of what the user sees. The HMD device 10 further includes one or more audio speakers 16 and one or more IR illumination sources 19 for use with the depth camera(s) 18. The HMD device 10 also includes circuitry (not shown), which may be contained within the visor 12, to control at least some of the aforementioned elements and perform associated data processing functions (e.g., speech and gesture recognition and display generation). The circuitry may include, for example, one or more memories and one or more processors, such as a central processing unit (CPU), graphics processing unit (GPU) and/or holographic processing unit (HPU). Note that in other embodiments the aforementioned components may be located in different locations on the HMD device 10. Additionally, some embodiments may omit some of the aforementioned components and/or may include additional components not mentioned above.

The technique introduced here can be used to maintain calibration of the positions and orientations of any one or more of the above-mentioned sensors, such as the head-tracking cameras 17. To facilitate description, the example of a camera is used henceforth in this description as a sensor to be calibrated. It will be understood, however, that the technique can be similarly applied to any of various other types of sensors or sensor subsystems.

In calibrations for an HMD device, one can compute "intrinsic" parameters and/or "extrinsic" parameters for each sensor. In a camera, for example, intrinsic parameters can be a distortion and projection model, $\pi$. For an IMU, they can be a matrix containing Scale, Bias, and Mixing Matrix. Extrinsic parameters can be Rotation and Translation, $[R,t]_{Rig}^{Camera}$. One possible reason to compute these parameters for a camera on an HMD is so that 3D points in space can be related to camera image pixels. The following equation and its inverse can be used to transform between 3D space and camera image space:

$$\begin{bmatrix} u \\ v \\ 1 \end{bmatrix}^{camera} = \pi \left( \left( [R,t]_{Rig}^{Camera} \cdot [R,t]_{World}^{Rig} \cdot \begin{bmatrix} x \\ y \\ z \end{bmatrix}^{World} \right) \right)$$

where u and v are camera image coordinates and $[R,t]_{World}^{Rig}$ is computed by the tracking system. To implement a virtual rigid framework (VRF, or simply "the framework") that can sense 6 DOF transformations, one would calibrate it ahead of time to understand the relationship between the "target sensor" (the sensor to be tracked) and the VRF receiver that is mounted to it. This can take the form of a 6DOF transform, $[R,t]_{VRF\ Receiver}^{Camera}$. When the device is in use, the system can use the VRF to compute the transform from the VRF transmitter to the VRF receiver, $[R,t]_{VRF\ Transmitter}^{VRF\ Receiver}$.

Then, the equation at runtime for mapping between 3D space and camera image space becomes:

$$\begin{bmatrix} u \\ v \\ 1 \end{bmatrix}^{camera} = \qquad (1)$$

$$\pi \left( \left( [R,t]_{VRF\ Receiver}^{Camera} \cdot [R,t]_{VRF\ Transmitter}^{VRF\ Receiver} \cdot [R,t]_{World}^{VRF\ Transmitter} \begin{bmatrix} x \\ y \\ z \end{bmatrix}^{World} \right) \right)$$

A similar approach can be taken with IMU measurements.

A VRF that is not capable of sensing all 6DOF between the transmitter and receiver is still useful and can improve the accuracy of an autocalibration algorithm. An autocalibration algorithm can minimize the error in an equation, such as:

$$\text{Error} = \pi \left( \left( [R,t]_{Rig}^{Camera} \cdot [R,t]_{World}^{Rig} \cdot \begin{bmatrix} x \\ y \\ z \end{bmatrix}^{World} \right) \right) - \begin{bmatrix} u \\ v \\ 1 \end{bmatrix}_{detected}$$

The term $[R,t]_{Rig}^{Camera}$ in this equation can be modified to minimize the error of the overall equation.

Suppose, however, that a VRF is only capable of sensing three degrees of freedom orientation (as would be the case if a pair of gyros were used) and not translation. For that scenario the equation can be modified to solve only for translation, for example, as follows:

Error =

$$\pi \left( \left( [1,t]_{Rig}^{Camera} \cdot ([R,0]_{Rig}^{Camera})_{VRF} \cdot [R,t]_{World}^{Rig} \cdot \begin{bmatrix} x \\ y \\ z \end{bmatrix}^{World} \right) \right) - \begin{bmatrix} u \\ v \\ 1 \end{bmatrix}_{detected}$$

This makes the optimization less computationally intense, and fewer degrees of freedom ("DOF") also makes it more accurate. This can be done with any combination of axes sensed by the system, so if the VRF senses range and a single axis of rotation, it would have a similar form.

One can also use a VRF even if its sensing capability is not accurate enough to use directly as in equation (1) above. In that case, one can add calibration parameters for the VRF into the optimization and minimize them along with the target sensor calibration.

An equation that incorporates this can be as follows, where the function $f$ transforms raw data from the VRF system into a 6DOF pose using some input calibration parameters that the system could optimize:

Error =

$$\left[ \pi \left( \left( [R,t]_{VRF}^{Camera} \cdot f(\text{Raw Data, VRF Calibration}) \cdot [R,t]_{World}^{Rig} \cdot \begin{bmatrix} x \\ y \\ z \end{bmatrix}^{World} \right) \right) - \begin{bmatrix} u \\ v \\ 1 \end{bmatrix}_{detected} \right]$$

Alternatively, the system might only optimize camera extrinsic parameters but use the VRF estimates of pose to penalize unlikely solutions, where the function g is a loss function that operates on a difference between transformations:

$$\text{Error} = \left[ \pi \left( \left( [R,t]_{Rig}^{Camera} \cdot [R,t]_{World}^{Rig} \cdot \begin{bmatrix} x \\ y \\ z \end{bmatrix}^{World} \right) \right) - \begin{bmatrix} u \\ v \\ 1 \end{bmatrix}_{detected} \right] + g\left( [R,t]_{Rig}^{Camera} \cdot [R,t]_{VRF}^{Camera^{-1}} \right)$$

As mentioned above, the technique introduced here in certain embodiments uses magnetic tracking. In at least some such embodiments, the system includes at least a magnetic transmitter antenna, a magnetic receiver antenna, transmitter electronic and receiver electronics. Optionally the magnetic system may also include a reference antenna. The magnetic transmitter antenna contains one or more coils, each of which can be a separate component or integrated on a printed circuit board (PCB). The magnetic receiver antenna includes multiple coils, each of which can be a separate component, integrated on a PCB or an internal part of a sensor to be tracked (e.g., a voice coil of the auto-focus mechanism of a camera). Each magnetic receiver coil is rigidly attached to the sensor to be tracked. The transmitter includes electronics for driving the transmitter antenna. The electronics may be hardwired or programmable or a combination thereof. The receiver includes electronics for processing signals picked up by the receiver antenna. The receiver electronics also may be hardwired or programmable or a combination thereof. The reference antenna, if provided, is also a magnetic receiver antenna, but is installed in a reference physical location, to provide the ability for self-calibration of the magnetic system, and to provide more precise measurement by enabling comparison of data from the reference antenna and receiver antenna of the tracked sensor.

To better understand operation of the system, assume that a device (e.g., an HMD device) includes Nt of transmitter coils and includes Nr receiver coils for each sensor to be tracked. The transmitter antenna coils emit low-frequency modulated or non-modulated signals. Different coils may use different methods of separation, such as frequency division multiple access (FDMA), time division multiple access (TDMA), code division multiple access (CDMA), or other suitable technique. The receiver measures the received signal at each receiver coil for each transmitter coil. There should be Nr*Nt values per sensor. In a typical case, Nt=3 and Nr=3, but that is not necessary the case. For example, there may instead be four transmitter antennas and two receiver antennas.

The receiver signal magnitude depends on the distance between the receiver and transmitter coils, their relative orientations and the environment (e.g., metals and ferromagnetic materials affecting the magnetic field). There are at least two possible methods of recovering relative position and orientation of the coils from measured values: 1) Using previously measured calibration data, and 2) Numerically resolving a system of equations for the magnetic field strength for every coil.

Using previously measured calibration data may be advantageous, as it takes into account all environment factors automatically. Once per design the following data are collected: the magnetic field reading when the tracked object is displaced from its initial position and orientation. During actual use, a lookup is made through a table of the collected design data to find the best match. To obtain better accuracy, interpolation (linear, polynomial or other) can be done to determine the best match between the recovered position/orientation and magnetic values.

Alternatively, the approach of numerically resolving a system of equations for the magnetic field strength for every coil can be used. The formula for magnetic field strength, B(r), can be stated as follows:

$$B(r) = \frac{\mu_0}{4\pi}\left(\frac{3r(m \cdot r)}{[r]^2} - \frac{m}{[r]^2}\right)$$

where r is the distance between the receiver and transmitter coils, $\mu_0$ is the magnetic constant equal to $4\pi \times 10^{-7}$ H·m, and m (vector) is the magnetic moment of the transmitter coil.

It is necessary to find a solution only in close vicinity to the original position of the tracked sensor, which significantly simplifies the calculation process and resolves the ambiguities resulting from the symmetry of the magnetic field. More specifically, in many embodiments it may be known that a sensor is unlikely to rotate 180 degrees, since tracking is on a much smaller scale of motion, e.g., on the order of one degree of rotation and one mm of translation.

To increase the accuracy of the measurement, statistical processing of the data may be used: The data distribution of measurements collected over a long period of time may provide additional accuracy.

Figure 2:
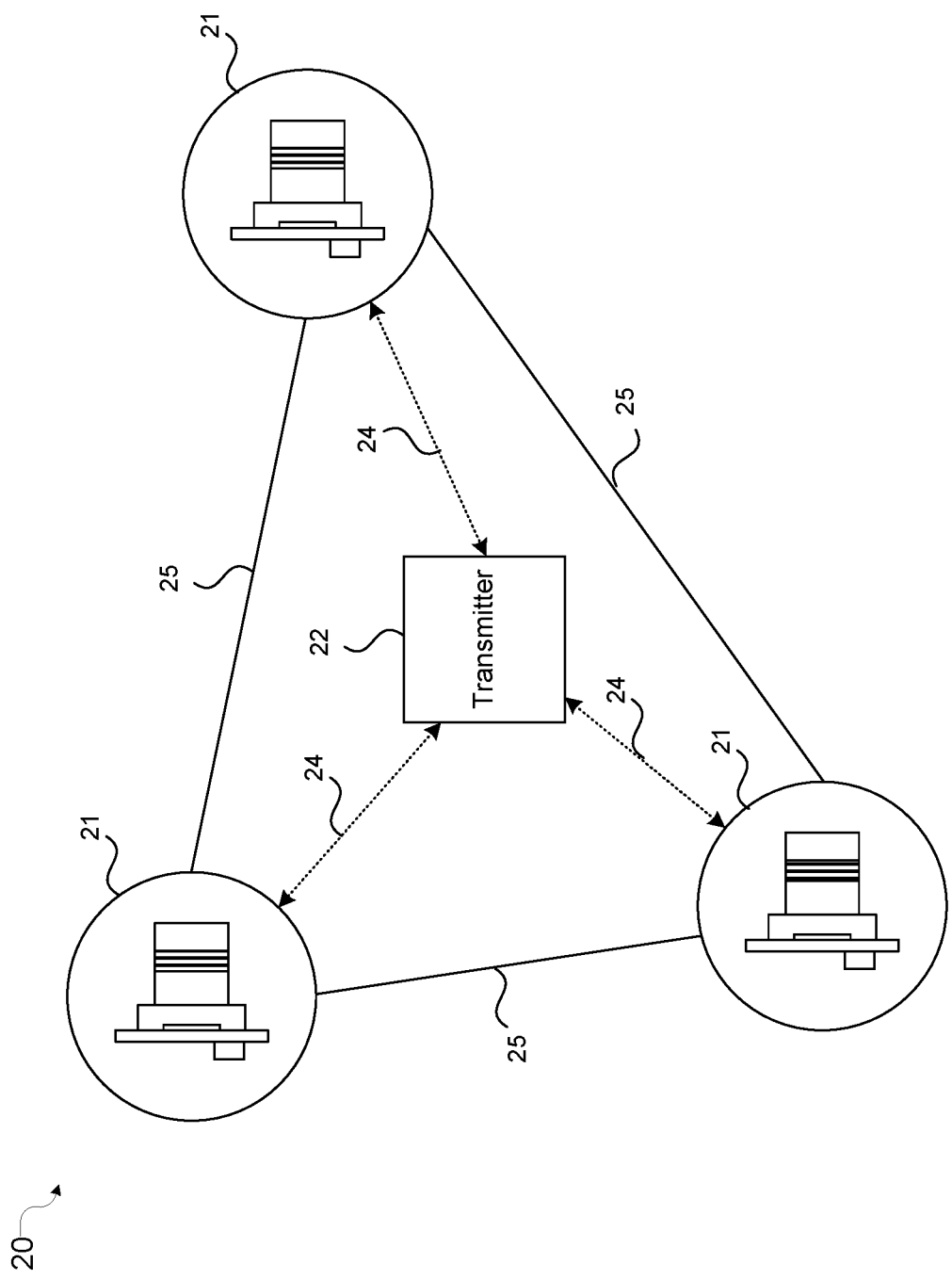
FIG. 2 schematically illustrates a sensor subsystem in a non-line-of-sight virtual rigid framework.

The technique is now further explained with reference to FIG. 2. A sensor subsystem 20 includes several sensor modules, namely, camera modules 21. Each camera module 21 includes is able to measure continually its position relative to the transmitter 22, which is the common reference point. The transmitter 22 is the center of the "rig," and a "virtual rigid framework" 25 is established between all camera modules 21 in the subsystem 20, by use of wireless communication 24 between the transmitter 22 and each camera module 21. Appropriate adjustments can be applied to computations and/or generated images based on the detected displacements. Optionally, an IMU (not shown) can be provide and mounted so as to be rigidly coupled to the transmitter 22, to allow for high frequency corrections to displacement measurements.

In certain embodiments, magnetic tracking (e.g., sensing of magnetic field) is employed to track the positional or orientational displacement of each sensor relative to the framework. This involves non-line-of-sight tracking of positional and orientational displacement of the target sensors (e.g., cameras), which provides greater flexibility in locating sensors within the containing device than a line-of-sight (e.g., optical) tracking technique could provide. Magnetic field based tracking operates using high frequency oscillations in field and is insensitive to interference outside of the frequency range. Furthermore, the impact of external interference decreases proportionally to the cube of the distance from the interference source, making this approach robust against such interference.

In other embodiments, however, other types of tracking methods may be used, which may include line-of-sight tracking, non-line-of-sight tracking (e.g., laser based), or a combination thereof. For example, IMUs, though more expensive, could also be used to measure at least some of the above-mentioned parameters. It is possible to compute rotation between a pair of gyros very accurately. The accelerometer of an IMU may allow additional constraining of the distance between two sensors. It should be noted, however, that IMUs tend to be sensitive to mounting conditions, and their performance tends to vary with temperature.

In embodiments that use magnetic tracking, the transmitter 22 can be or include one or more coils coupled to a current source. Each target sensor (e.g., camera) has at least one receiver (also called "detector"), such as a magnetic field sensitive coil, built integrally with the target sensor or mechanically coupled tightly to the target sensor or in close proximity to the sensor (e.g., within one centimeter). Each receiver also is or includes a separate sensor, i.e., a sensor of positional and/or orientational displacement of a target sensor. A single receiver coil and transmitter coil provides data sufficient to compute displacement of the target sensor in two orientation angles and distance to the transmitter, which can be computed using conventional mathematical techniques. Additional receive coils can be used to increase accuracy of the system through joint optimization. For example, three receiver coils oriented orthogonally to each other and tightly coupled to or integral with the target sensor can be used to detect positional and orientational displacement of the target sensor in 6DOF. Additional transmitter coils can be used to further increase accuracy. Magnetic field based tracking systems suitable for this purpose (e.g., with sufficient accuracy and small enough form factor) are available today off-the-shelf, but are not thought to have been used or proposed for tracking or calibration of other sensors, as introduced herein.

Figure 3:
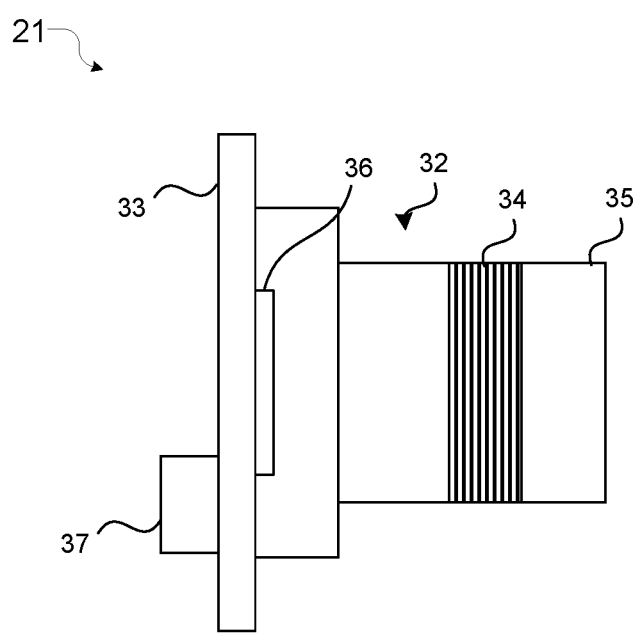
FIG. 3 illustrates a camera and associated magnetic field sensor.

FIG. 3 shows an example of how a coil can be integrated with a camera. A camera module 21 includes a miniature camera 30 coupled to a printed circuit board (PCB) 33. A receive coil 34 can be wrapped around and integrated with at least part of the lens barrel 35 of the camera 30, to receive the magnetic field generated by the transmitter 22. Note that it may be possible to use voice coil technology used for autofocus modules to integrate receivers into camera barrels. Alternatively, the receive coil 34 could be mounted on PCB 33 next to the camera 30. The camera 30 can be mounted to the PCB 33, which can be mounted at any convenient location in the containing device. A detector circuit module (also called the "receiver") 36 can be mounted to the PCB 33 and electrically coupled to the coil 34, and configured to detect changes in the magnetic field (generated by the transmitter) experienced at the coil 34. Data generated by the detector circuit module 36 is passed to a surface-mount technology (SMT) communication interface 37, which passes the data to an off-board processor (not shown). A pose (position and orientation) measurement can be taken each time a reading is taken from the sensor (e.g., every time a frame is captured from the camera 30), or it can be taken more or less frequently if desired. For example, if high-frequency real-time position/orientation measurements are impractical or undesirable, they can be acquired in long-duration measurement sessions (e.g., several minutes), and statistical methods can be used to improve their accuracy.

Figure 4:
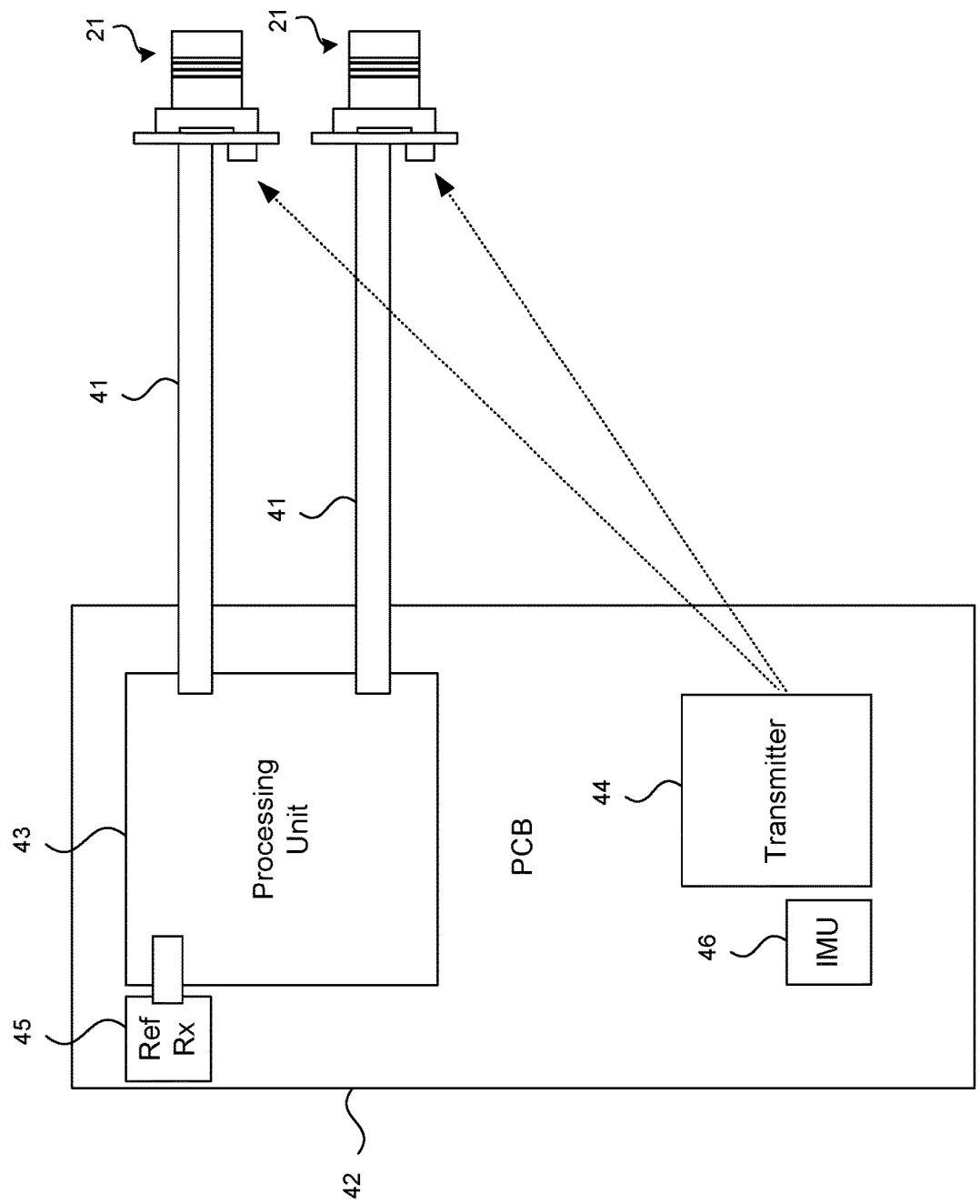
FIG. 4 illustrates an implementation for coupling multiple cameras and associated sensors to a transmitter and related components in a non-line-of-sight virtual rigid framework.

FIG. 4 illustrates how camera modules such as that shown in FIG. 3 can be coupled with a transmitter and related components. Specifically, each camera module 21 can be coupled via a flex circuit 41 to a processing unit 43 on a PCB 42. Each such flex circuit 41 may carry the image data from the corresponding camera module 21 as well as the displacement data from the camera's associated displacement sensor. The processing unit 43 computes an adjustment (correction) value based on the displacement data from each displacement sensor. The adjustment (correction) value may be used to interpret the data from the image. Alternatively, it may be used as a direct adjustment of the generated image data, or it may be an adjustment of other data used in or related to the process of generating images (e.g., user head position/orientation). The processing unit 43 may be, for example, an HPU, GPU or main CPU of the headset.

In the illustrated embodiment, the transmitter 44, optional reference receiver 45 and an optional IMU 46 are also mounted on the PCB 42. Although magnetic transmitters tend to be relatively large, size scales with the designed range of transmission. For a short range system such as described here, the transmitter 44 can be packaged as an SMT component and built onto the headset's main logic board, which may be made of thermally stable FR4, for example. The optional IMU 46 is mounted as close as possible and tightly to the transmitter 44 on the PCB 42 and is used to augment the magnetic system, allowing estimation of shared rotations between all receivers. For HMD applications, the transmitter 44 is preferably placed very close to the receivers, allowing for highly accurate tracking.

Note that for greatest accuracy, the magnetic transmitter/receiver subsystem also must be kept in calibration. One way to accomplish this is to build a reference receiver into the system at a precisely known distance from the transmitter 44. The reference receiver 45, therefore, can be used to maintain calibration of signal intensity from the transmitter 44 in the illustrated embodiment. Further, it is possible to use a known distance between the magnetic receivers as a reference to constrain transmitter parameters. For example, magnetic field information with some additional degrees of freedom, such as optical information, can be used to constrain target sensor position in an auto-calibration algorithm. To accomplish this, one can use a nonlinear optimization that minimizes an error function, for example.

Typically one needs to resolve 6DOF per sensor (three positional and three orientational). Consequently, three transmitter antenna coils and three receiver antenna coils will provide sufficient data (e.g., nine values) to fully resolve position and orientation. However, one can use additional coils (e.g., five transmitter coils and three receiver coils) to provide more data, which can be used to improve accuracy and provide auto-calibration. For example, assume that identical transmitter coils (not shown) are symmetrically placed on the center line of the device. A receiver coil of known orientation may assume that it is also located on the center line when the signals from the two transmitter coils are equal. Alternatively, one can use a reference receiver placed at a reference position on the center line and electronically match the transmitter power for the two transmitter coils to be equal. This will compensate for any manufacturing difference between the two transmitter coils. Hence, the extra variables provided by additional receiver and transmitter coils allow automatic compensation for the manufacturing variability of parameters without the need for extra calibration.

Figure 5:
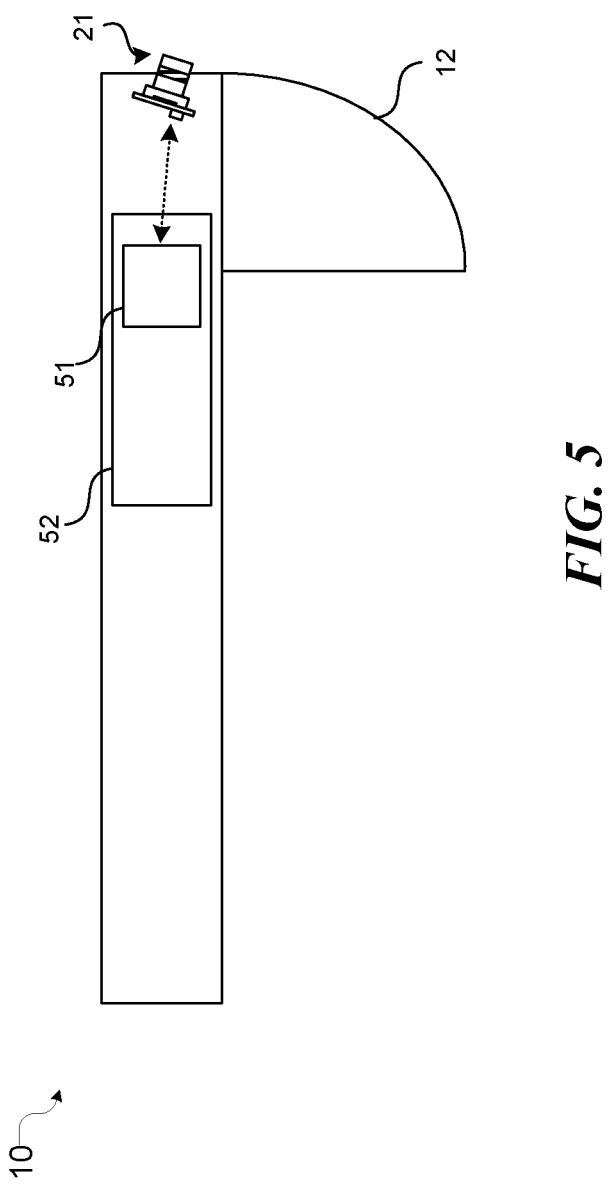
FIG. 5 shows an example of how a sensor with associated tracking sensor and transmitter can be mounted on an HMD device.

FIG. 5 illustrates an example of how this technique can be employed on the HMD device ("headset") 10 of FIG. 1. A camera (sensor) module 21 with integrated coil is mounted to a desired location on the headset 10. The transmitter 51 (including a transmit coil) is separately mounted to a PCB 52 on the headset 10. With current magnetic field generation/detection technology, the transmitter 51 can be located essentially anywhere on the headset 10 and still provide sufficient accuracy. Note that the transmitter 51 can be used for position/orientation calibration of additional sensors (not shown).

Figure 6:
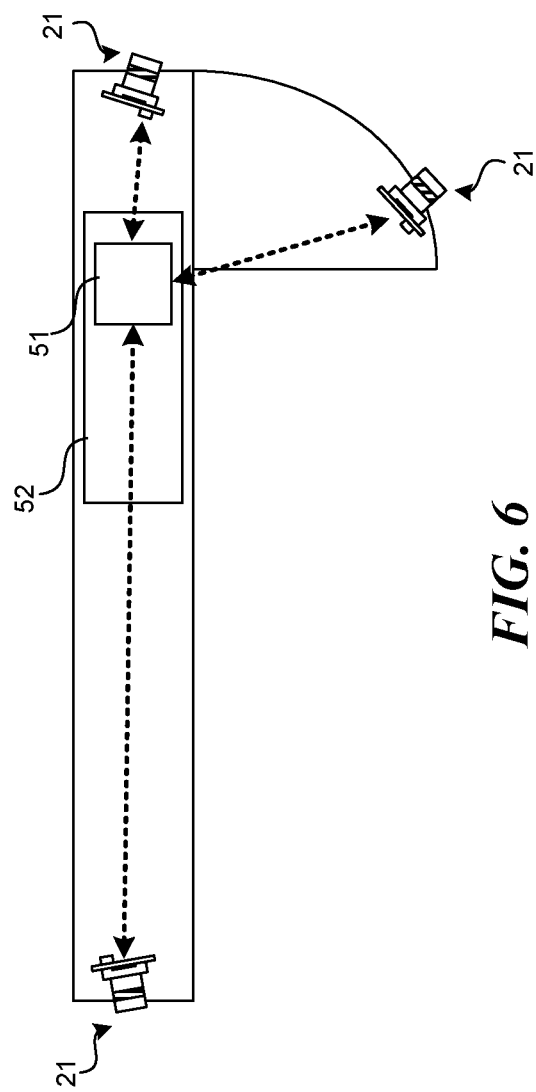
FIG. 6 shows another example of how a sensor with associated tracking sensor and transmitter can be mounted on an HMD device.

Various new design options arise when active sensor position tracking is used as described herein. Target sensors can be mounted directly to the visor or other housing components, eliminating the need for any rigid mounting structure for the target sensors. Hence, cameras or other target sensors can be mounted essentially anywhere on the headset. FIG. 6 illustrates another embodiment of an HMD headset, which includes multiple cameras (sensors) coupled to a transmitter in a virtual rigid framework in a sensor subsystem.

Figure 7:
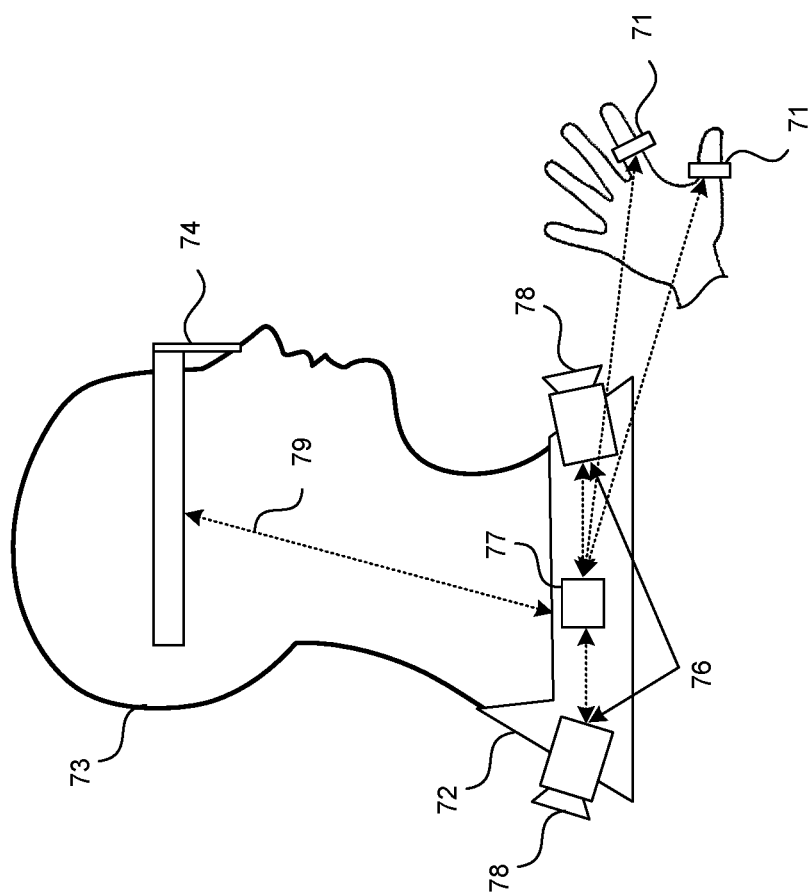
FIG. 7 shows an example of how the non-line-of-sight virtual rigid framework can be used to facilitate wearable sensors that are not physically coupled to a headset.

Furthermore, the target sensors do not necessarily have to be mounted on the headset at all, as illustrated in FIG. 7. For example, the non-line-of-sight virtual rigid framework technique introduced here facilitates integration of wearable target sensors that are not physically coupled to the headset. The target sensors can be built into flexible materials such as clothing. Magnetic tracking sensors 71 can be incorporated into articulated gloves, as shown, and other skeletal tracking systems can be easily integrated in similar manner. In some embodiments, optical tracking can be combined with magnetic tracking for calibration.

In one potential application, represented in FIG. 7, the non-line-of-sight sensor tracking technique introduced here is used to facilitate a "world tracking" subsystem built into a lightweight shoulder pack 72 that can be worn by the user 73 and used conjunction with a very lightweight AR display headset 74. The world-tracking subsystem 76 can be used to precisely track the user's position and orientation in the real world, which information can be used to precisely generate AR display content for the user. The world-tracking subsystem can include an electronics module 77 that contains the transmitter, processor, memory and battery, and world-sensing/tracking components such as cameras. Relative magnetic tracking 79 such as described above can be employed along with virtual rigid framework sensors (such as described above) on the headset 74, to precisely locate the cameras 78 relative to the headset 74.

Figure 8:
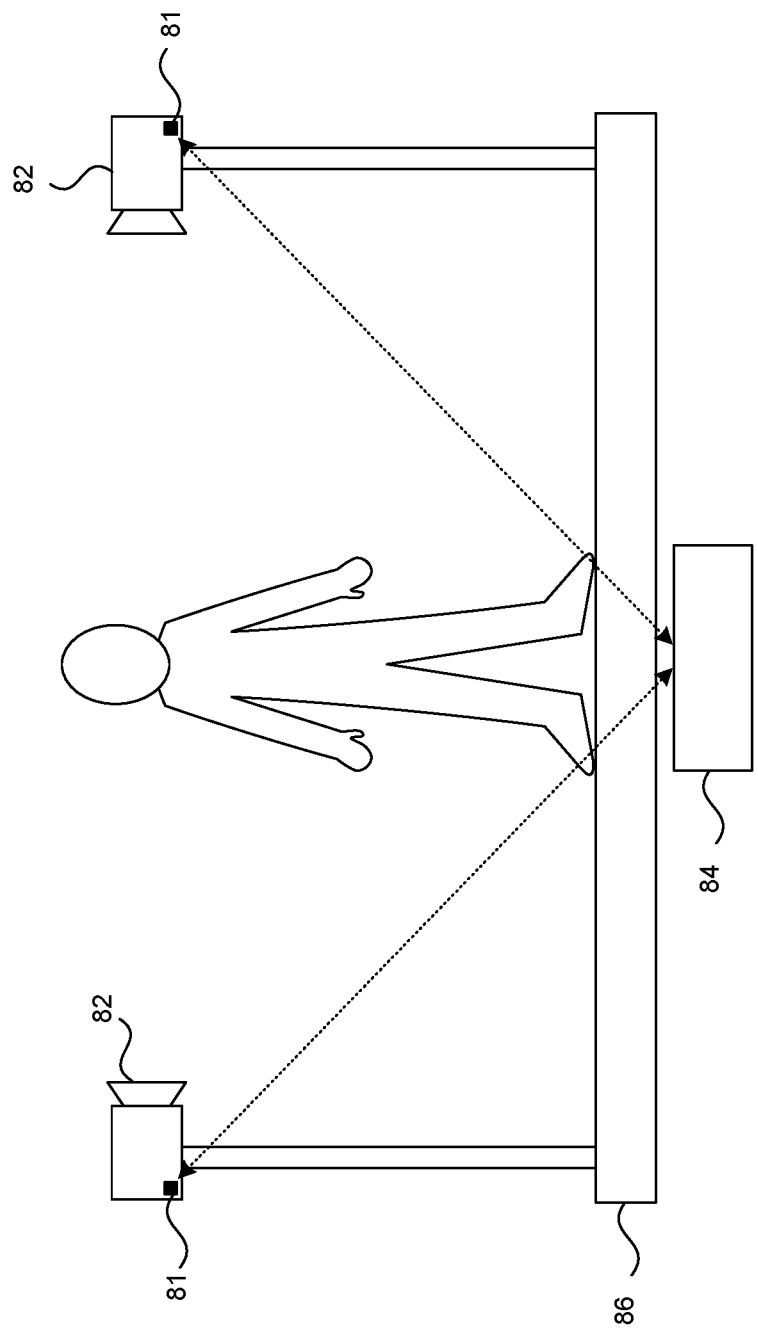
FIG. 8 schematically illustrates a portable holocapture studio that employs a non-line-of-sight virtual rigid framework.

Another potential application of the non-line-of-sight sensor tracking technique introduced here is to improve holocapture technology. The term "holocapture" as used herein refers to the use of video recording technology to acquire 3D display content for use in an AR or VR system. Such techniques generally use multiple video cameras placed fixedly around a "stage," which defines the area to be recorded. Holocapture systems require very precise positional and orientational calibration of the video cameras and, therefore, generally are not portable and not amenable to quick setup and tear down. The non-line-of-sight virtual rigid framework technique introduced here, therefore, can be used to create small, portable holocapture studios. As illustrated in FIG. 8, this can be done, for example, by attaching or integrating magnetic tracking sensors 81 into each holocapture video camera 82, where each video camera 82 is removably yet rigidly mounted on the stage 86, and providing an associated fixed magnetic transmitter 84 that is also removably yet rigidly mounted on the stage 86. Accuracy may be reduced because of increased range; however, this can be mitigated by using a more powerful transmitter, using a magnetic tracker to initialize the camera positions, keeping each camera stationary after initial setup, and/or running online auto-calibration software to refine estimates.

Figure 9:
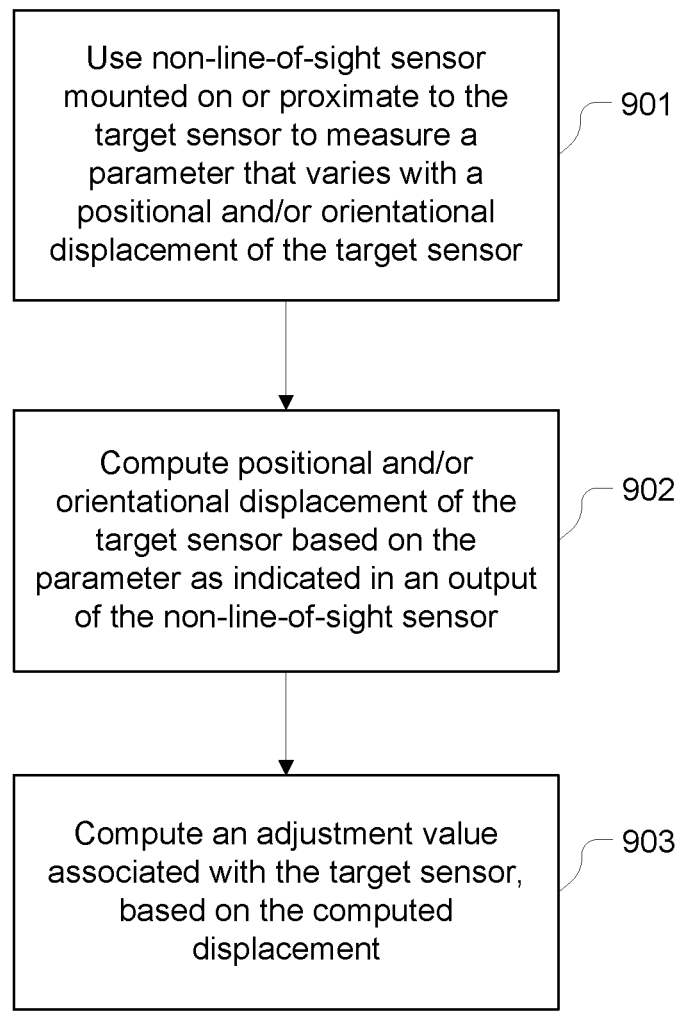
FIG. 9 illustrates an example of a process for performing the non-line-of-sight sensor tracking technique.

FIG. 9 illustrates an example of a process for performing the non-line-of-sight sensor tracking technique introduced here. Initially, at step 901 a non-line-of-sight sensor mounted on or proximate to a target sensor (the sensor to be calibrated), is used to measure a parameter that varies with a positional and/or orientational displacement of the target sensor. The parameter may be, for example, a magnetic field strength and/or direction. At step 902 the process computes a positional and/or orientational displacement of the target sensor based on the parameter as indicated in an output of the non-line-of-sight sensor. At step 903 the process computes an adjustment value associated with the target sensor, based on the computed displacement.

Figure 10:
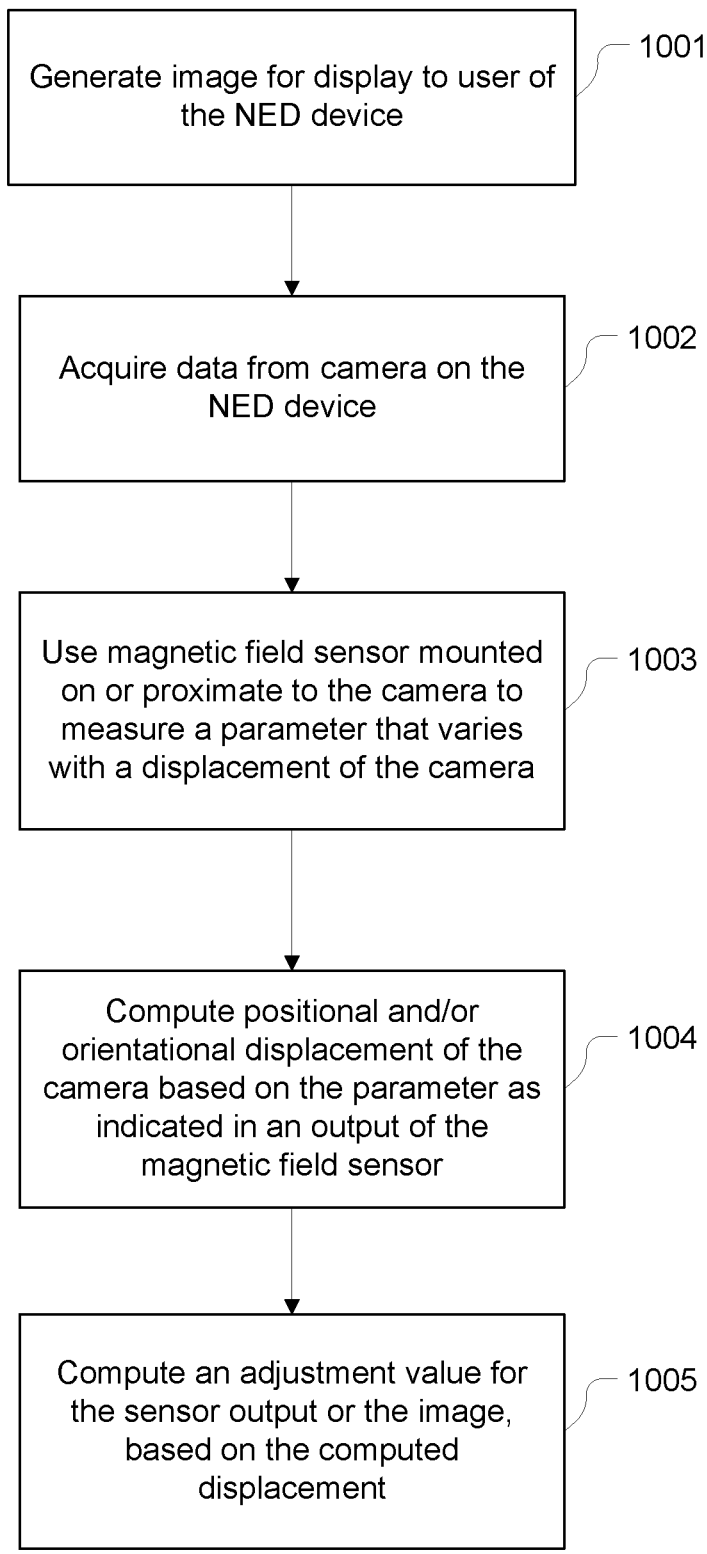
FIG. 10 illustrates an example of a process for performing the non-line-of-sight sensor tracking technique for a camera in an NED device.

FIG. 10 more specifically illustrates an example of a process for performing the non-line-of-sight sensor tracking technique for a camera in an NED device, such as an AR-configured HMD device. It will be recognized, however, the technique has many other possible applications, some of which are described above, particularly but not limited to those in which line-of-sight tracking is impractical. Further, it will be recognized that the same technique can be applied concurrently to multiple cameras and/or other sensors concurrently in the NED device in similar manner. At step 1001, the NED device generates an image for display to user of the NED device. At step 1002 the device acquires data from a camera on the NED device. The camera may be, for example, a head-tracking camera, the output of which is used to generate and/or modify the above-mentioned image. At step 1003 a magnetic field sensor mounted on or proximate to the camera is used to measure a parameter that varies with a displacement of the camera. At step 1004, processing circuitry on the device computes a positional and/or orientational displacement of the camera, based on the parameter as indicated in an output of the magnetic field sensor at step 1005, processing circuitry on the device computes an adjustment value associated with the sensor output or the image, based on the computed displacement.

As described above in reference to FIG. 7, the non-line-of-sight virtual rigid framework allows the use of target sensors (e.g., wearable sensors) that are not physically coupled to the transmitter. In such embodiments, the distance between the magnetic field transmitter and the magnetic field receiver can significantly impact performance of the framework. Magnetic field intensity decreases as the inverse cube of the distance between the transmitter and receiver. At some distance, the signal-to-noise ratio (SNR) at the receiver may become so low that accurate tracking of the position or orientation of the target sensor becomes impossible. Accordingly, introduced here is a technique for dynamically optimizing performance parameters of the non-line-of-sight virtual rigid framework so as to improve or maintain accuracy under various different conditions.

A decrease in SNR due to increased distance between the transmitter and the receiver can be prevented, or at least mitigated, by increasing the transmission power of the transmitter. However, increasing the transmission power increases power consumption, which may be undesirable or unacceptable in certain implementations, such as in mobile devices that have limited power supplies (e.g., batteries). Accordingly, in certain embodiments, the technique introduced here dynamically adjusts the receiver bandwidth of the magnetic field sensor (e.g., of the detector circuit module 36 in the example FIG. 3) to achieve a desired trade-off between accuracy (SNR) and latency for the current conditions (e.g., distance from transmitter to receiver, or operating state of the system).

The SNR at the receiver tends to be inversely proportional to the receiver's bandwidth. That is, as bandwidth of the receiver decreases, SNR at the receiver tends to increase, other factors being equal. Hence, bandwidth at the receiver can be reduced dynamically and automatically during operation of the system (e.g., by adjusting the filter parameters of the receiver) to improve SNR, when necessary to achieve a desired degree of positional/orientational accuracy. Although receiver bandwidth also tends to increase latency within the receiver, lower latency may be acceptable in at least some situations. On the other hand, in some situations, low latency may be more important than high accuracy, such as when tracking a relatively fast moving object, such as a user's hand.

Accordingly, in certain embodiments the framework divides its operational area (e.g., the area around the user in the case of an HMD device) into at least two regions, in terms of the distance between the receiver and transmitter: a near region and a far region. In the near region, the SNR is high and the magnetic tracking system operates with low (receiver) latency. In the far region, the SNR tends to be low, so receiver bandwidth is dynamically reduced (at the expense of higher latency) to maintain adequate SNR and thereby keep the accuracy of the magnetic tracking in an acceptable range. The precise boundaries/sizes of these regions will depend on the specific application and design parameters.

Note that while the following description focuses mainly on dynamically varying receiver bandwidth to maintain SNR (and therefore accuracy) at an acceptable level, it is possible to vary one or more other parameters, instead of or in addition to receiver bandwidth. For example, in some embodiments, it may be desirable to vary transmission power.

The required accuracy is not necessary a constant: As indicated above, the required accuracy at close range (e.g., for hand tracking for an activity such as "air handwriting") may be different from the accuracy at far range (e.g., hand tracking for virtual sword fighting). The accuracy can be part of a controlled tradeoff between accuracy and latency as determined by the application or user experience, based on control of the receiver bandwidth.

Figure 11:
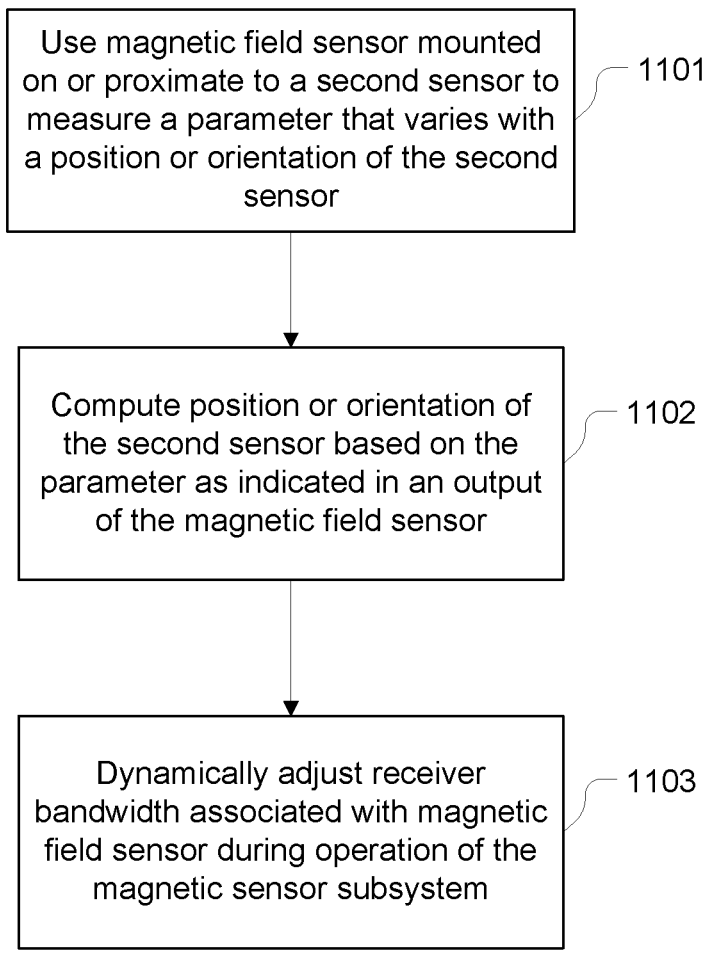
FIG. 11 shows an example of a process for performing non-line-of-sight sensor tracking with a magnetic tracking system while dynamically controlling performance parameters of the magnetic tracking system

FIG. 11 shows an example of a high-level process for performing non-line-of-sight sensor tracking with a magnetic tracking system while dynamically controlling performance parameters of the magnetic tracking system. At step 1101 the VRF uses a magnetic field sensor mounted on or proximate to a second sensor to measure a parameter that varies with a position or orientation of the second sensor. At step 1102 the VRF computes the position or orientation of the second sensor based on the parameter as indicated in an output of the magnetic field sensor. At step 1103 the VRF dynamically adjusts the receiver bandwidth associated with magnetic field sensor during operation of the magnetic sensor subsystem. Step 1103 may be performed by, for example, the receiver itself (e.g., detector circuit module 36 in the example of FIG. 3) or by a processor/controller coupled to the receiver. Note that as with other processes described herein, the steps do not necessarily have to be performed in the order described here. For example, the tracking steps 1101 and 11102 may be performed after or concurrently with the performance adjustment step 1103.

There are numerous possible ways of controlling the receiver bandwidth. For example, the receiver bandwidth can be shaped by varying the parameters of one or more (hardware or software) filters associated with the magnetic field sensor after demodulation of the received magnetic field signal. Note, however, that any filter tends to introduce the group delay of the signal, which affects the latency. The higher the group delay is, the lower is the latency.

Figure 12:
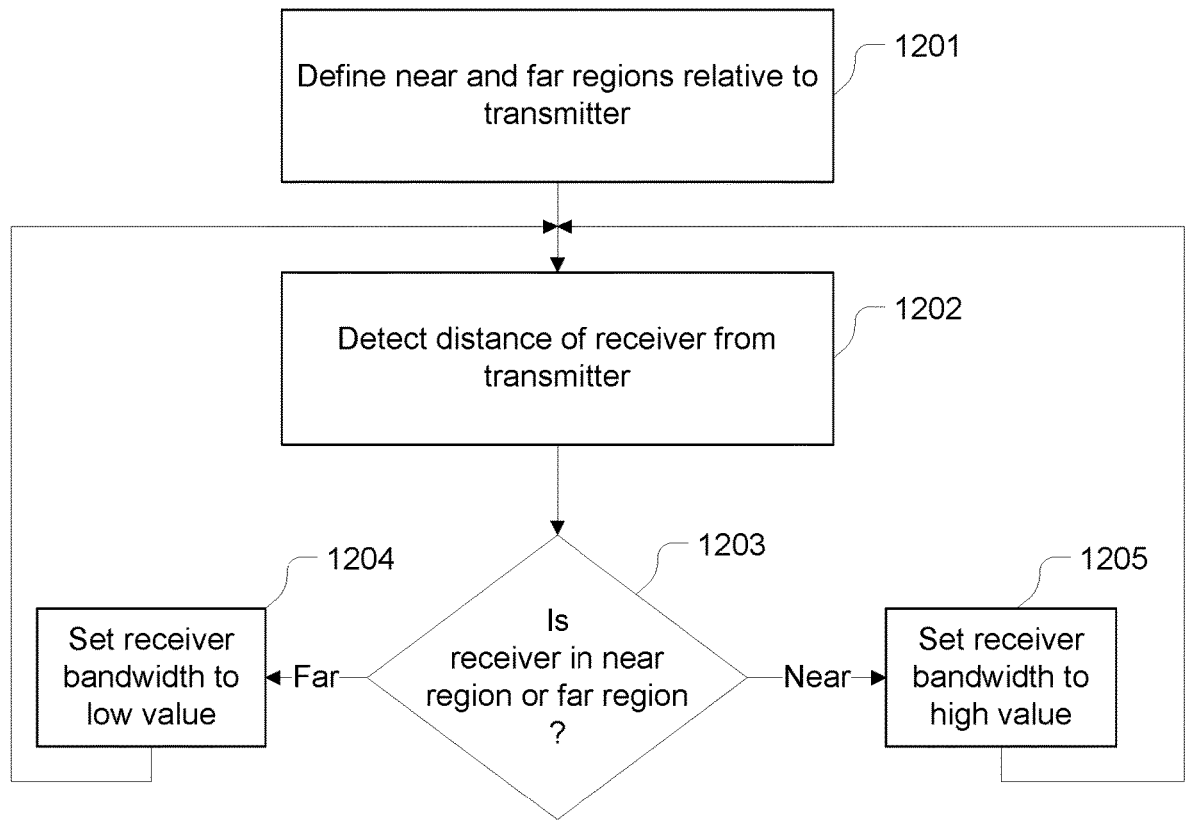
FIG. 12 illustrates an example of a process for dynamically controlling performance parameters based on distance between transmitter and receiver.

FIG. 12 illustrates an example of a process for dynamically controlling performance parameters based on the distance between the magnetic field transmitter and a magnetic field receiver. At step 1201, the process defines a near region and a far region relative to the magnetic field transmitter. The specific sizes and boundaries of these regions generally are application-specific. The region sizes and shapes can be defined and stored in a memory of the VRF prior to use.

They can be determined based on, for example, the SNR expected for a given distance between transmitter and receiver. In other embodiments, rather than defining specific regions, the process can simply measure the SNR directly, as described further below.

At step 1202, the process detects the distance of the receiver from the transmitter. This can be done, for example, by the receiver detecting the magnetic field strength, based on the well-known mathematical relationship between magnetic field strength and distance. The process next determines at 1203 whether the receiver is currently in the near region or the far region. This step can be done by the receiver or an associated processor, or by the transmitter or an associated processor by providing the relevant data from the receiver to the transmitter. If the receiver is determined to be in the far region, the process proceeds to step 1204, in which the receiver bandwidth is set to a specified low value (relative to its range of possible bandwidths), in order to increase SNR at the receiver and thereby increase accuracy, to keep the accuracy at an acceptable level. Otherwise, if the receiver is determined to be currently in the near region, the process proceeds to step 1205, in which the receiver bandwidth is set to a relatively high value (relative to its range of possible bandwidths), to maintain low latency (since SNR is not a problem under this condition). From step 1204 or 1205, the process loops back to step 1202. Steps 1203-1205 each can be performed entirely by the receiver, or by the receiver in response to control input from another device, such as the transmitter or an associated processor.

Figure 13:
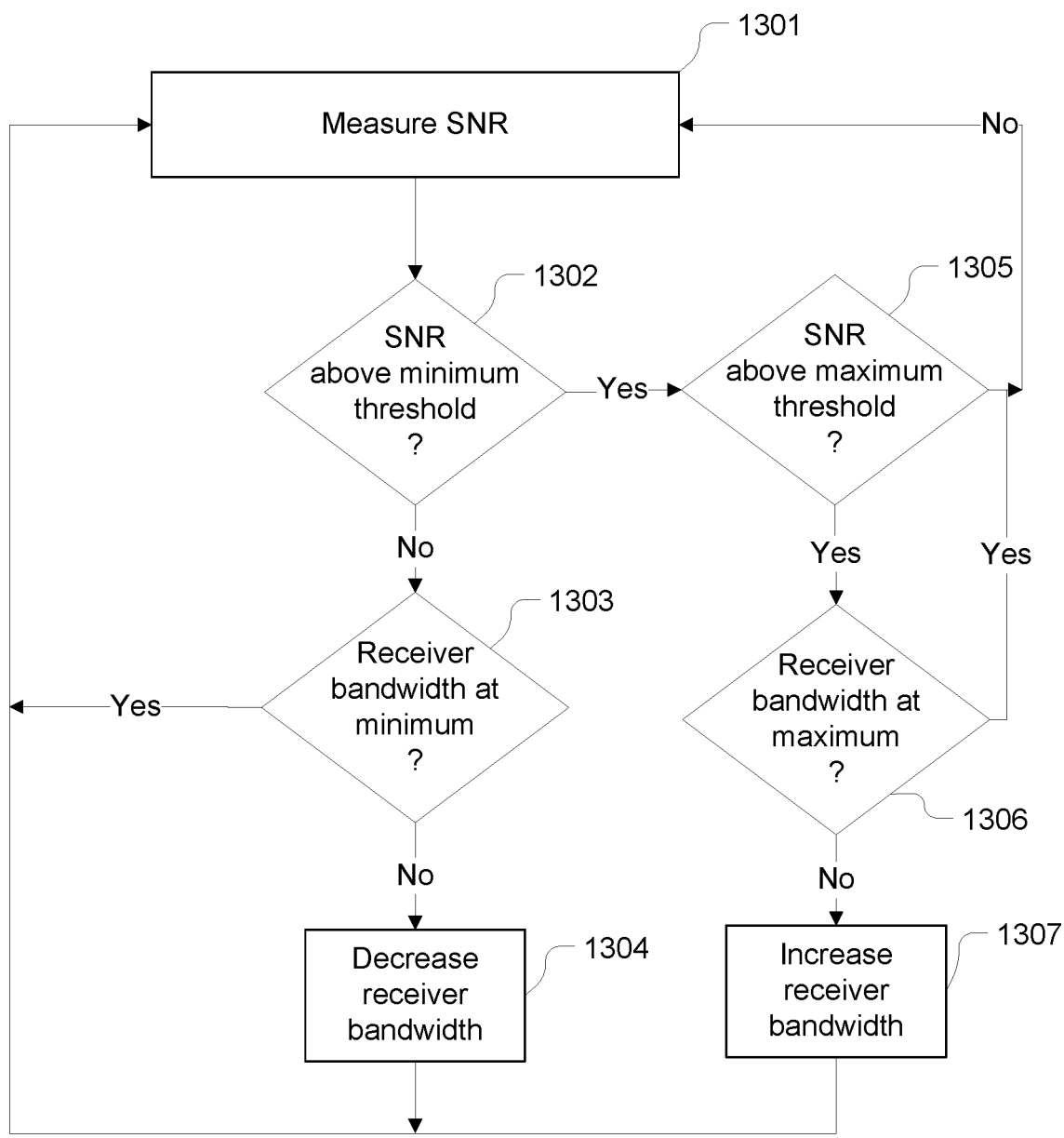
FIG. 13 illustrates an example a process for dynamically setting operating parameters based on direct SNR measurement.

As noted above, instead of actually determining a spatial region in which the receiver is located, the SNR can be measured and used directly as a basis for dynamically setting the receiver bandwidth (or other operating parameters). FIG. 13 illustrates an example a process for dynamically setting operating parameters based on direct SNR measurement. Initially, at step 1301 the process measures the SNR at the magnetic field receiver. The process then determines at step 1302 whether the SNR is above a minimum threshold (e.g., an SNR value needed to provide at least a certain level of accuracy). If the SNR is determined to be above the minimum threshold, then the process proceeds to step 1305, in which it is determined whether the SNR is also above a maximum threshold (e.g., an SNR value above which further increasing the SNR provides no improvement in accuracy). If the SNR is above both the minimum and maximum thresholds in steps 1302 and 1305, respectively, the process loops back to step 1301.

If the SNR is below the minimum threshold at step 1302, then the process proceeds to step 1303, which determines whether the receiver bandwidth is already set to its minimum value. If the receiver bandwidth is already set to its minimum value, then the process loops back to step 1301. If the receiver bandwidth is not already set to its minimum value, then the process decreases the receiver bandwidth (e.g., by a predetermined or dynamically determined amount) at step 1504, and then loops back to step 1301. In at least one embodiment, the bandwidth of the receiver can vary from about 10 Hz (for long distance between transmitter and receiver) to about 300 Hz (for short distance between transmitter and receiver).

If the SNR was determined to be above the minimum threshold at step 1302 but below the maximum threshold at step 1305, then the process proceeds to step 1306, which determines whether the receiver bandwidth is already set to its maximum value. If the receiver bandwidth is already set to its maximum, the process loops back to step 1301. If the receiver bandwidth is not already set to its maximum, then the process proceeds to step 1307, in which the receiver bandwidth is increased (e.g., by a predetermined or dynamically determined amount), and then loops back to step 1301.

In some embodiments of the VRF it may be desirable to dynamically vary the receiver bandwidth and/or other parameters based on the operational state of the VRF. For example, that may be useful for purposes of synchronization of the receiver and transmitter. Because the magnetic field receiver and transmitter are wireless, they have no common reference of precise time. When they are powered on, there is no way to determine the polarity of a symmetrical carrier signal, resulting in ambiguity in the receivers' determined orientation angle relative to the transmitter. By measuring the magnetic field strength at the receiver for a known transmission strength (power) with a symmetrical carrier signal, the system can only solve for two candidate orientation angles that are 180 degrees apart.

By instead using an asymmetrical transmitted signal, the system can determine receiver position and orientation after power on without this 180-degree ambiguity. An asymmetrical signal is one in which the positive half of the waveform does not have the same shape as the negative half of the waveform, in the time domain. For example, the positive portion of the waveform may be a typical half sine wave while the negative half of the waveform may be a half sine wave clipped flat at a level above the sine wave's minimum. However, an asymmetrical signal has a wider spectrum than a symmetrical signal, so asymmetry will be filtered out by a narrowband receiver.

Consequently, the technique introduced here can include setting the magnetic field receiver into the higher-bandwidth mode immediately after power up, to facilitate acquiring synchronization using an asymmetrical carrier signal. After synchronization is established, the asymmetry is no longer required, so the transmitter can then be set into a normal operational mode, such as described above, where asymmetric carrier signal is used. The synchronization is preferably performed closer than the greatest distance between the receiver and transmitter that allows an acceptable SNR to be maintained even for high-bandwidth receiver mode.

Figure 14:
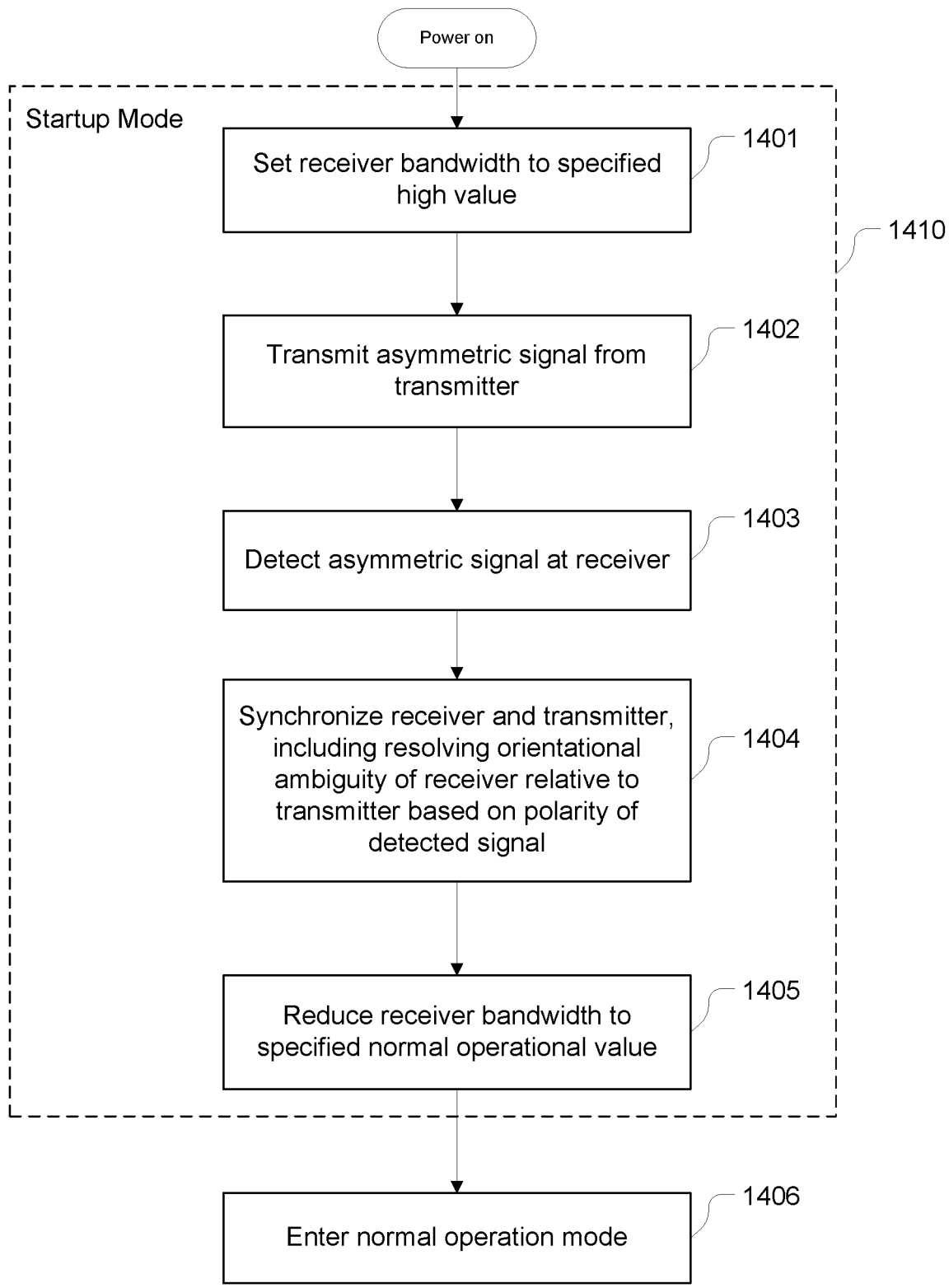
FIG. 14 illustrates an example of a process for dynamically controlling receiver bandwidth based on operational mode of the system.

FIG. 14 illustrates an example of a process for dynamically controlling receiver bandwidth based on the operational mode of the system, and in particular, to facilitate transmitter-receiver synchronization. Initially, upon power-up of the VRF the process enters a startup mode 1410, beginning with step 1401. At step 1401 sets the receiver bandwidth to a specified high value (relative to its range of possible values). The process then transmits an asymmetric carrier signal from the transmitter at step 1402. The asymmetric signal is detected by the receiver at step 1403. The system then synchronizes the receiver and the transmitter at step 1404. This step includes resolving ambiguity in the orientation angle of the receiver relative to the transmitter based on the polarity of the detected asymmetric signal. Because the receiver bandwidth is set to a relatively high value, the asymmetry of the signal is detected by the receiver.

After synchronization is complete, the process reduces the receiver bandwidth to a specified normal operational value at step 1405. In general, this will be an intermediate value relative to the range of possible bandwidth values of the receiver. The process then places the system into normal operational mode at step 1406, in which the tracking and dynamic performance optimization functions described above are performed with a symmetric carrier signal.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, means: a) special-purpose hardwired circuitry, such as one or more application-specific integrated circuits (ASICs), programmable logic devices (PLDs), field programmable gate arrays (FPGAs), or other similar device(s); b) programmable circuitry programmed with software and/or firmware, such as one or more programmed general-purpose microprocessors, digital signal processors (DSPs) and/or microcontrollers, system-on-a-chip systems (SOCs), or other similar device(s); or c) a combination of the forms mentioned in a) and b).

Examples of Certain Embodiments

Certain embodiments of the technology introduced herein are summarized in the following numbered examples:

1. A method comprising: using a magnetic field sensor mounted on or proximate to a second sensor to measure a parameter that varies with a position or an orientation of the second sensor, the magnetic field sensor being part of a sensor calibration system for calibrating output of the second sensor; computing the position or orientation of the second sensor based on the parameter as indicated in an output of the magnetic field sensor; and dynamically adjusting a receiver bandwidth of the magnetic sensor subsystem during operation of the magnetic sensor subsystem.

2. A method as recited in example 1, further comprising: determining a parameter that represents or that is a function of a distance between the magnetic field sensor and a magnetic field transmitter of the sensor calibration system; wherein dynamically adjusting the receiver bandwidth of the magnetic sensor subsystem is based on the parameter.

3. A method as recited in example 1 or example 2, wherein dynamically adjusting the receiver bandwidth of the magnetic sensor subsystem includes: setting the receiver bandwidth of the magnetic field sensor to a first setting that produces at least a first signal-to-noise ratio when the magnetic field sensor is located a first distance from the magnetic field transmitter; and reducing the receiver bandwidth of the magnetic field sensor to increase the signal-to-noise ratio when the magnetic field sensor is located a second distance from the magnetic field transmitter that is greater than the first distance.

4. A method as recited in any of examples 1 to 3, further comprising: defining a near region surrounding the magnetic field transmitter; defining a far region surrounding the magnetic field transmitter, such that the near region is between the magnetic field transmitter and the far region; and determining whether the magnetic field transmitter is located within the near region or the far region; wherein dynamically adjusting the receiver bandwidth of the magnetic sensor subsystem includes setting the receiver bandwidth of the magnetic field sensor to a first setting when the magnetic field sensor is determined to be in the near region, and reducing the receiver bandwidth of the magnetic field sensor to increase a signal-to-noise ratio when the magnetic field sensor is determined to have transitioned from the near region to the far region.

5. A method as recited in any of examples 1 to 4, further comprising: defining a near region surrounding the magnetic field transmitter; defining a far region surrounding the magnetic field transmitter, such that the near region is between the magnetic field transmitter and the far region; wherein dynamically adjusting the receiver bandwidth of the magnetic sensor subsystem includes: operating the sensor calibration system at a first receiver bandwidth of the magnetic sensor, a first signal-to-noise ratio and a first system latency, when the magnetic field sensor is determined to be located within the near region; and operating the sensor calibration system at a second receiver bandwidth of the magnetic sensor, a second signal-to-noise ratio and a second system latency, when the magnetic field sensor is determined to be located within the far region, wherein the second receiver bandwidth is lower than the first receiver bandwidth and the second system latency is higher than the first system latency.

6. A method as recited in any of examples 1 to 5, wherein the second signal-to-noise ratio is at least equal to the first signal-to-noise ratio.

7. A method as recited in any of examples 1 to 6, wherein dynamically adjusting the receiver bandwidth of the magnetic sensor subsystem is based on a current operational state of the sensor calibration system.

8. A method as recited in any of examples 1 to 7, wherein dynamically adjusting the receiver bandwidth of the magnetic sensor subsystem is based on whether the sensor calibration system is in a startup state or in a normal operation state.

9. A method as recited in any of examples 1 to 8, further comprising: selecting a first receiver bandwidth for the magnetic sensor to use if the magnetic sensor subsystem is in the startup state or a second receiver bandwidth for the magnetic sensor to use if the magnetic sensor subsystem is in the normal operation state, wherein the first receiver bandwidth is greater than the second receiver bandwidth.

10. A method as recited in any of examples 1 to 9, wherein dynamically adjusting the receiver bandwidth of the magnetic sensor subsystem comprises setting the receiver bandwidth to a first bandwidth or a second bandwidth, wherein the second bandwidth is smaller than the first bandwidth; the method further comprising: during a start-up phase of the magnetic sensor subsystem, setting the receiver bandwidth of the magnetic sensor to the first bandwidth, transmitting an asymmetrical signal from the magnetic field transmitter, and using the magnetic field sensor to detect the asymmetrical signal using the first bandwidth; and during a normal operation phase of the magnetic sensor subsystem, transmitting a second signal from the magnetic field transmitter at the second bandwidth, and using the magnetic field sensor to measure the parameter by detecting the second signal using the second bandwidth.

11. A method as recited in any of examples 1 to 10, wherein adjusting the receiver bandwidth of the magnetic field sensor comprises adjusting filter parameters of the magnetic field sensor.

12. A method as recited in any of examples 1 to 11, further comprising: determining an expected approximate speed of relative motion between the magnetic field transmitter and the magnetic field sensor; wherein dynamically adjusting the accuracy of the magnetic sensor subsystem is further based on the expected approximate speed of motion between the magnetic field transmitter and magnetic field sensor.

13. A method as recited in any of examples 1 to 12, wherein dynamically adjusting the accuracy of the magnetic sensor subsystem comprises: operating the sensor calibration system in a first configuration state corresponding to a first level of accuracy when the expected approximate speed of motion between the magnetic field transmitter and the magnetic field sensor is in a first range; and operating the sensor calibration system in a second configuration state corresponding to a second level of accuracy greater than the first level of accuracy when the expected approximate speed of motion between the magnetic field transmitter and the magnetic field sensor is a second range of lower magnitude than the first range.

14. A system comprising: a magnetic field sensor for mounting rigidly on or proximate to an object and configured to measure a parameter that varies with a displacement of the object relative to a magnetic field transmitter; and at least one processor coupled to the magnetic field sensor, the at least one processor configured to dynamically adjust a receiver bandwidth associated with the magnetic field sensor, during operation of the system, and to compute the displacement of the object based on the parameter.

15. A system as recited in example 14, wherein the at least one processor is further configured to determine a parameter that represents or that is a function of a distance between the magnetic field sensor and the magnetic field transmitter; and wherein dynamically adjusting the receiver bandwidth comprises reducing the receiver bandwidth in response to a change in the parameter being indicative of an increase in the distance between the magnetic field sensor and the magnetic field transmitter.

16. A system as recited in example 13 or example 14, wherein dynamically adjusting the receiver bandwidth comprises: operating the system with a first receiver bandwidth if the magnetic sensor subsystem is in a startup state or with a second receiver bandwidth if the magnetic sensor subsystem is in a normal operation state, wherein the first receiver bandwidth is greater than the second receiver bandwidth.

17. A magnetic sensor subsystem comprising: means for dynamically adjusting a receiver bandwidth of a magnetic field sensor of a magnetic sensor subsystem during operation of the magnetic sensor subsystem, when the magnetic field sensor is mounted on or proximate to a second sensor; means for computing the displacement of the second sensor based on the parameter; means for determining an adjustment value based on the computed displacement; and means for applying the adjustment value to an output of the second sensor to calibrate the second sensor.

18. A magnetic sensor subsystem as recited in example 17, further comprising means for determining a distance between the magnetic field sensor and a magnetic field transmitter, wherein dynamically adjusting the receiver bandwidth of the magnetic sensor subsystem is based on the distance.

19. A magnetic sensor subsystem as recited in example 17 or example 18, further comprising means for determining a distance between the magnetic field sensor and a magnetic field transmitter; wherein dynamically adjusting the receiver bandwidth of the magnetic sensor subsystem comprises reducing the receiver bandwidth of the magnetic sensor subsystem to maintain at least a specified signal-to-noise ration.

20. A magnetic sensor subsystem as recited in any of examples 17 to 19, wherein dynamically adjusting the receiver bandwidth of the magnetic sensor subsystem comprises: operating the magnetic sensor subsystem with a first receiver bandwidth if the magnetic sensor subsystem is in a startup state or with a second receiver bandwidth if the magnetic sensor subsystem is in a normal operation state, wherein the first receiver bandwidth is greater than the second receiver bandwidth.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
measuring, via a magnetic field sensor mounted on or proximate to a sensor, a parameter that varies with a position or an orientation of the sensor, the magnetic field sensor being part of a sensor calibration system for calibrating output of the sensor;
determining the position or orientation of the sensor based on the parameter as indicated in an output of the magnetic field sensor; and
dynamically adjusting a receiver bandwidth of the magnetic field sensor during operation of the magnetic field sensor based at least on the determined position or orientation, wherein dynamically adjusting the receiver bandwidth of the magnetic field sensor includes:
setting the receiver bandwidth of the magnetic field sensor to a setting that produces at least a signal-to-noise ratio when the magnetic field sensor is located a first distance from a magnetic field transmitter; and
reducing the receiver bandwidth of the magnetic field sensor to increase the signal-to-noise ratio when the magnetic field sensor is located a second distance from the magnetic field transmitter that is greater than the first distance.

2. The method of claim 1, further comprising:
determining a parameter that represents or that is a function of a distance between the magnetic field sensor and a magnetic field transmitter of the sensor calibration system;
wherein dynamically adjusting the receiver bandwidth of the magnetic field sensor is further based on the parameter.

3. The method of claim 1, further comprising:
defining a near region surrounding the magnetic field transmitter;
defining a far region surrounding the magnetic field transmitter, such that the near region is between the magnetic field transmitter and the far region; and
determining whether the magnetic field transmitter is located within the near region or the far region,
wherein dynamically adjusting the receiver bandwidth of the magnetic field sensor includes:
setting the receiver bandwidth of the magnetic field sensor to a distinct setting when the magnetic field sensor is determined to be in the near region, and
reducing the receiver bandwidth of the magnetic field sensor to increase a signal-to-noise ratio when the magnetic field sensor is determined to have transitioned from the near region to the far region.

4. The method of claim 1, further comprising:
defining a near region surrounding the magnetic field transmitter; and
defining a far region surrounding the magnetic field transmitter, such that the near region is between the magnetic field transmitter and the far region,
wherein dynamically adjusting the receiver bandwidth of the magnetic field sensor includes:
operating the sensor calibration system at a first receiver bandwidth of the magnetic field sensor, a first signal-to-noise ratio and a first system latency, when the magnetic field sensor is determined to be located within the near region; and
operating the sensor calibration system at a second receiver bandwidth of the magnetic field sensor, a second signal-to-noise ratio and a second system latency, when the magnetic field sensor is determined to be located within the far region, wherein the second receiver bandwidth is lower than the first receiver bandwidth and the second system latency is higher than the first system latency.

5. The method of claim 4, wherein the second signal-to-noise ratio is equal to the first signal-to-noise ratio.

6. The method of claim 1, wherein dynamically adjusting the receiver bandwidth of the magnetic field sensor is further based on a current operational state of the sensor calibration system.

7. The method of claim 6, wherein dynamically adjusting the receiver bandwidth of the magnetic field sensor is further based on whether the sensor calibration system is in a startup state or in a normal operation state.

8. The method of claim 7, further comprising:
selecting a first receiver bandwidth for the magnetic field sensor if the sensor calibration system is in the startup state, or
selecting a second receiver bandwidth for the magnetic field sensor if the sensor calibration system is in the normal operation state, wherein the first receiver bandwidth is greater than the second receiver bandwidth.

9. The method of claim 1, wherein dynamically adjusting the receiver bandwidth of the magnetic field sensor includes setting the receiver bandwidth to a first bandwidth or a second bandwidth, wherein the second bandwidth is smaller than the first bandwidth,
the method further comprising:
while in a start-up phase of the sensor calibration system:
setting the receiver bandwidth of the magnetic field sensor to the first bandwidth;
transmitting an asymmetrical signal from the magnetic field transmitter; and
using the magnetic field sensor to detect the asymmetrical signal using the first bandwidth; and
while in a normal operation phase of the magnetic sensor calibration system:
transmitting a second signal from the magnetic field transmitter at the second bandwidth; and
using the magnetic field sensor to measure the parameter by detecting the second signal using the second bandwidth.

10. The method of claim 1, wherein dynamically adjusting the receiver bandwidth of the magnetic field sensor includes adjusting one or more filter parameters of the magnetic field sensor.

11. The method of claim 1, further comprising:
determining an expected approximate speed of relative motion between the magnetic field transmitter and the magnetic field sensor; and
dynamically adjusting an accuracy of the magnetic field sensor based on the expected approximate speed of motion between the magnetic field transmitter and magnetic field sensor.

12. The method of claim 11, wherein dynamically adjusting the accuracy of the magnetic field sensor includes:
operating the sensor calibration system in a first configuration state corresponding to a first level of accuracy when the expected approximate speed of motion between the magnetic field transmitter and the magnetic field sensor is in a first range; and
operating the sensor calibration system in a second configuration state corresponding to a second level of accuracy greater than the first level of accuracy when the expected approximate speed of motion between the magnetic field transmitter and the magnetic field sensor is a second range of lower magnitude than the first range.

13. A system comprising:
a magnetic field sensor for mounting rigidly on or proximate to an object and configured to measure a parameter that varies with a displacement of the object relative to a magnetic field transmitter; and
at least one processor coupled to the magnetic field sensor, the at least one processor configured to:
determine the displacement of the object based on the parameter; and
dynamically adjust a receiver bandwidth associated with the magnetic field sensor, during operation of the system based on the determined displacement, wherein to dynamically adjust the receiver bandwidth, the at least one processor is configured to:
operate with a first receiver bandwidth if the system is in a startup state or with a second receiver bandwidth if the system is in a normal operation state, wherein the first receiver bandwidth is greater than the second receiver bandwidth.

14. The system of claim 13, wherein the at least one processor is further configured to determine a parameter that represents or that is a function of a distance between the magnetic field sensor and the magnetic field transmitter; and
wherein dynamically adjusting the receiver bandwidth comprises reducing the receiver bandwidth in response to a change in the parameter being indicative of an increase in the distance between the magnetic field sensor and the magnetic field transmitter.

15. A magnetic sensor subsystem comprising:
means for determining a displacement of a sensor based on a parameter;

means for determining an adjustment value based on the displacement; and means for applying the adjustment value to an output of the sensor to calibrate the sensor;

means for determining a distance between the magnetic field sensor and a magnetic field transmitter; and means for dynamically adjusting a receiver bandwidth of a magnetic field sensor during operation of the magnetic sensor subsystem based at least on the determined displacement, when the magnetic field sensor is mounted on or proximate to a second sensor, wherein dynamically adjusting the receiver bandwidth of the magnetic sensor subsystem includes reducing the receiver bandwidth of the magnetic sensor subsystem to maintain at least a specified signal-to-noise ration.

16. The magnetic sensor subsystem of claim 15, wherein dynamically adjusting the receiver bandwidth of the magnetic sensor subsystem is further based on the distance.

17. The magnetic sensor subsystem of claim 15, wherein dynamically adjusting the receiver bandwidth of the magnetic sensor subsystem includes:

operating the magnetic sensor subsystem with a first receiver bandwidth if the magnetic sensor subsystem is in a startup state or with a second receiver bandwidth if the magnetic sensor subsystem is in a normal operation state, wherein the first receiver bandwidth is greater than the second receiver bandwidth.

* * * * *